US012300081B2

(12) United States Patent
Hussain (10) Patent No.: US 12,300,081 B2
(45) Date of Patent: May 13, 2025

(54) INTELLIGENT DOORBELL FOR A SECURITY SYSTEM

(71) Applicant: Khurram Hussain, Irvine, CA (US)

(72) Inventor: Khurram Hussain, Irvine, CA (US)

( * ) Notice: Subject to any disclaimer, the term of this patent is extended or adjusted under 35 U.S.C. 154(b) by 0 days.

(21) Appl. No.: 18/340,835

(22) Filed: Jun. 24, 2023

(65) Prior Publication Data

US 2025/0046165 A1 Feb. 6, 2025

(51) Int. Cl.
| | |
|---|---|
| *G08B 13/196* | (2006.01) |
| *G06V 10/94* | (2022.01) |
| *G06V 20/30* | (2022.01) |
| *G06V 20/52* | (2022.01) |
| *G06V 40/16* | (2022.01) |
| *G06V 40/20* | (2022.01) |
| *H04L 12/28* | (2006.01) |

(52) U.S. Cl.
CPC ....... *G08B 13/19613* (2013.01); *G06V 20/30* (2022.01); *G06V 40/28* (2022.01); *G08B 13/19606* (2013.01); *H04L 12/282* (2013.01); *G06V 10/95* (2022.01); *G06V 20/52* (2022.01); *G06V 40/172* (2022.01); *G06V 40/25* (2022.01); *H04L 2012/2841* (2013.01)

(58) Field of Classification Search
None
See application file for complete search history.

(56) References Cited

U.S. PATENT DOCUMENTS

| | | | |
|---|---|---|---|
| 9,113,051 B1 * | 8/2015 | Scalisi | H04N 7/188 |
| 10,742,938 B2 * | 8/2020 | Scalisi | G07C 9/00857 |
| 11,217,076 B1 * | 1/2022 | Siminoff | H04N 7/181 |
| 2015/0365570 A1 * | 12/2015 | Kim | G08B 13/1445 |
| | | | 348/374 |
| 2019/0180125 A1 * | 6/2019 | Rozploch | G06V 40/166 |
| 2020/0312068 A1 * | 10/2020 | Scalisi | G06Q 10/0833 |
| 2021/0182111 A1 * | 6/2021 | Jakobsson | G06F 9/5055 |
| 2022/0027637 A1 * | 1/2022 | Madden | G08B 13/19645 |

FOREIGN PATENT DOCUMENTS

| | | | |
|---|---|---|---|
| CN | 107483899 A | * | 12/2017 |
| CN | 110276863 A | * | 9/2019 |
| CN | 113901858 A | * | 1/2022 |
| WO | WO-2019227553 A1 | * | 12/2019 |

* cited by examiner

*Primary Examiner* — Ricky Chin (57) ABSTRACT

A smart doorbell, for a security system, which is capable of performing functions including, person detection, facial recognition, motion detection, detection of baby or pet running away, weapon detection, fire detection, detection of parcel left at porch, parcel theft, dog poop detection, vehicle detection, animal detection, eavesdropper detection, a person jumping from backyard wall, and intruder detection. The functions are detected through a camera of the doorbell and, subsequently, AI-based alerts are generated.

23 Claims, 5 Drawing Sheets

INTELLIGENT DOORBELL FOR A SECURITY SYSTEM

BACKGROUND

The disclosed embodiments relate to a smart doorbell for a home security system.

Recently, cases of robbery, sexual assault, and other criminals breaking into the victim's residence and committing crimes are increasing. Especially in a trend where the proportion of single-person households is increasing, when you are at home alone, it can be quite frightening for someone to ring the doorbell and visit you. These visitors, like courier drivers, leave delivery items in front of the front door and go, but there are cases where they order food for delivery, deliver credit or check cards, or deliver registered mail, etc. There are times when face-to-face is unavoidable or the owner is away from and the home is left unattended, in that case, an efficient security system is required.

Some homes today are equipped with smart home networks to provide automated control of devices, appliances, and systems, such as heating, ventilation, and air conditioning ("HVAC") systems, lighting systems, alarm systems, and home theater and entertainment systems. Smart home networks may include control panels that a person may use to input settings, preferences, and scheduling information that the smart home network uses to provide automated control of the various devices, appliances, and systems in the home. For example, a person may input a desired temperature and a schedule indicating when the person is away from home. The home automation system uses this information to control the HVAC system to heat or cool the home to the desired temperature when the person is home, and to conserve energy by turning off power-consuming components of the HVAC system when the person is away from the home. Also, for example, a person may input a preferred nighttime lighting scheme for watching television. In response, when the person turns on the television at nighttime, the home automation system automatically adjusts the lighting in the room to the preferred scheme.

Smart homes with an improved intelligent security system is the need of the day. The disclosed embodiments provide a smart security solution to a home through its doorbell.

SUMMARY

The invention provides a doorbell, for a security system, acting as a hub of all activities, wirelessly connected to smart devices in premises, e.g. a house, office, or any building, configured to:
- be controllable and operable through a software installed on it, a client application installed on a user mobile device, and a central cloud database;
- sense activities by the camera and send artificial intelligence-based alerts, the activities including person detection, facial recognition, motion detection, detection of baby or pet runaway, weapon detection, fire detection, detection of parcels left at the porch, parcel theft, dog poop detection, vehicle detection, animal detection, eavesdropper detection, detection of a person jumping from backyard wall, and intruder detection;
- detect the owner's real-time location inside the building, when the owner interacts with the system;
- sense if someone tries to steal the doorbell by pulling it out of the wall;
- to enable the owner to track the doorbell location in case of its theft;
- detect the unconnected smart devices in the building and inform the owner;
- allow communication, between owner and visitor, through one-way/two-way audio/video calling and/or text messaging;
- allow the visitor to leave a voice message for the owner;
- recognize visitors from the owner's friends and followers of social media platforms;
- have the doorbell button automatically pressed by detecting a special hand gesture in front of the camera; and
- to work with smart locks with a real-time password mechanism.

DETAILED DESCRIPTION OF EMBODIMENTS

The disclosed embodiments provide a security system associated with premises e.g. a home. The security system comprises of a smart doorbell, a cloud server and database, a computer program installed on the doorbell, and a client application installed on the owner/user's mobile device. The doorbell is connected wirelessly to the smart devices of the home. The doorbell acts as a main hub of the security system. It detects and receives information about activities occurring at the door outside the home, processes this information according to the predefined instructions stored in it, and performs subsequent actions accordingly.

The doorbell comprises of a camera with fish eye lens, a processor, a Graphics processing unit (GPU), a touch screen for display, an accelerometer, a gyroscope 3-axis, a proximity sensor, a light sensor, a battery with battery temperature sensor, a fingerprint sensor, GPS, E-SIM module, Wi-Fi, Bluetooth, Zigbee, anti-theft wall mount, and a motion detection 3D radar sensor, or any combination thereof. The doorbell is chargeable from 16V-24V power supply for doorbells as well as from USB C-type charger.

The accelerometer is a motion sensor that detects changes in the device's velocity or orientation. This sensor is used to detect the device's movement and orientation changes, for example, when the device is tilted or shaken.

The gyroscope 3-axis sensor can be used for motion detection and orientation tracking, it may detect the removal of a bell from a wall for anti-theft purposes. A more suitable sensor for detecting the removal of an object from a fixed location, such as a wall-mounted bell, may be a magnetic contact sensor or a vibration sensor.

The proximity sensor detects the presence of nearby objects or surfaces by emitting a beam of infrared light and measuring the reflection back to the sensor. It can detect objects at a distance of 0.1 to 1.5 meters from the device.

The light sensor measures the ambient light level in the device's environment using a photodiode or phototransistor. It provides measurements in units of lux, a measure of illumination intensity. This sensor may be used to adjust the device's screen brightness and color temperature based on the lighting conditions.

Battery temperature is an important parameter for monitoring the health and performance of the device's battery. Such batteries are sensitive to temperature and can be negatively affected by both high and low temperatures. High temperatures can lead to battery degradation and reduced battery life, while low temperatures can reduce the battery's capacity and cause the device to shut down unexpectedly.

The fingerprint under-display optical sensor captures and verifies the user's fingerprint for secure authentication and unlocking of the device. It uses a series of optical sensors to capture a high-resolution image of the user's fingerprint through the device's display.

Motion detection 3D radar sensor uses radar technology to detect the motion of objects in front of the device, up to a range of several meters. It can detect the presence and movement of people, animals, and other objects, and may be used for gesture-based controls, gaming, and security applications.

Cloud storage receives and stores the information, and makes it accessible to smart devices connected to it.
The disclosed embodiments provide a security system, having a doorbell acting as a hub of all activities and is wirelessly connected to smart devices in the premises, for example, a house, office, or any building, where the doorbell is controllable and operable through, a software installed on it, a client application installed on the owner's mobile device, and, a central cloud server and database; and the doorbell is configured to:
  connect wirelessly to smart devices in a building;
  sense activities by the camera and send artificial intelligence-based alerts, the activities including person detection, facial recognition, unwanted person recognition, motion detection, detection of baby or pet running away, weapon detection, fire detection, detection of a parcel left at porch, detection of parcel theft, dog poop detection, vehicle detection, animal detection, eavesdropper detection, a person jumping from backyard wall and intruder detection;
  detect the owner's mobile device real-time location inside the building, when the owner interacts with the system to control smart devices;
  sense if someone tries to steal the doorbell by pulling it out of the wall;
  detect the unconnected smart devices in the building and inform the owner;
  allow communication, between owner and visitor, through one-way/two-way audio/video calling and/or text messaging;
  allow the visitor to leave a recorded voice message for the owner;
  recognize visitors from the owner's friends and followers of social media platforms, and mobile phone's gallery;
  have the button automatically pressed by detecting a special hand gesture in front of the doorbell camera; and
  to work with smart locks with a real-time password mechanism.

The invention detects the owner's mobile device real-time location inside the premises e.g. a home and allows the owner to command the smart devices, through an indoor positioning system, followed by a response action by the doorbell to that command. The indoor positioning system is built by, inputting the information of, the floor plan of the building comprising the number of floors, location of rooms, location of Wi-Fi router inside the home, location of Bluetooth beacons, and location of the doorbell; auto-calculating the room dimensions through the mobile's camera; by a process wherein an AI algorithm calculates the dimensions of a standard known size object on a wall, followed by the calculation of dimensions of the wall by using the dimensions of the standard object, and repeating the process for each wall of the room; surveying each room and submitting data points; and adding, into the database, the signal strengths of Wi-Fi, Bluetooth, and the doorbell. The doorbell helps smart devices to automatically sense the location of a person commanding/interacting with the system to control the connected IOT or smart devices in a home. The indoor positioning system predicts the user's phone location inside a home with the help of the smart devices connected to it.

Figure 1:
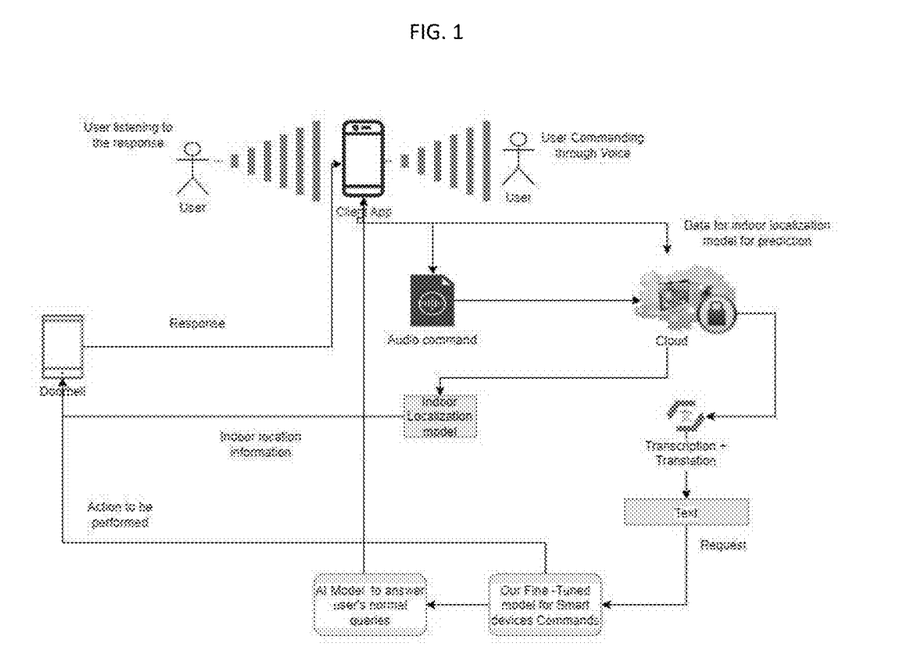
FIG. 1 illustrates the user interaction with the client app using voice or text command, the process involves audio recording and compression of that audio file to send to the cloud. Values required for AI-based indoor localization algorithm are also sent to the cloud to process the data and send feedback to the doorbell app. The user's voice command is processed through another AI algorithm with two different models and feedback is sent accordingly to the doorbell or to the client app.

The user completes the survey of his home first, which starts from the user's home map the outer boundary of which is obtained either through a satellite image, or manually drawn by the user, then the user puts the information of number of floors. After that, the user draws rooms and other locations on the floor. Users will also place Wi-Fi locations, Bluetooth beacons, and doorbell locations on the floor map. The user next opens his camera for automatic room length and width calculations. Finally, the user will survey the home, one by one in each room, and submit data points. As soon as the user submits any data point, diffident Wi-Fi strengths that are available, Bluetooth beacon signal strength, and doorbell's Wi-Fi signal strength are noted and added to the database. After completing the survey of the floor/home, the artificial intelligence (AI) model is trained on the collected data. The AI model is then able to predict the user's real-time location, by detecting his mobile device location inside the house using router's Wi-Fi signal strength and data of some parameters obtained from other devices located inside the user's house, whenever the user interacts through voice with the doorbell system for IOT devices. When the user gives a voice command the doorbell through the client application, the user's voice is recorded and sent to a separate AI algorithm on the cloud where first speech-to-text conversion happens, and then the converted text is fed into the AI models. The AI algorithm predicts if the user has asked to perform an action on any smart device, or the user has asked for any general query, like what's the weather today. Two different AI models are working independently for this task, one for the commands related to smart devices and the other to answer the user's regular query. The AI algorithm determines which model's answer the user has asked for and it will pass that answer to the doorbell or the client app, based on the response need, FIG. 1.

Figure 2:
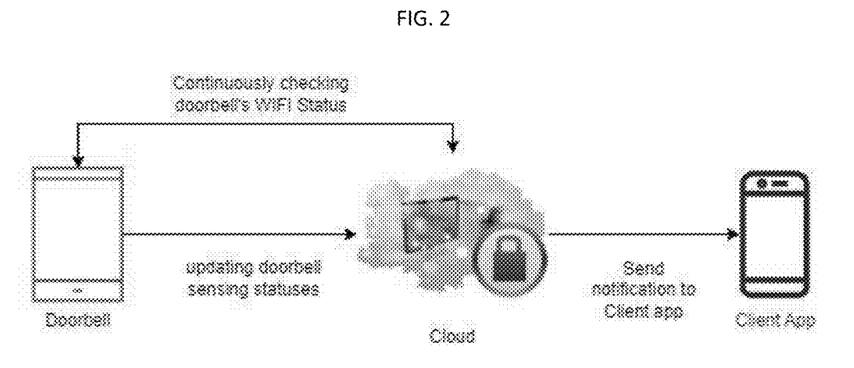
FIG. 2 shows the script running on the cloud continuously sensing a connection with the doorbell, and the doorbell sending data to the cloud for processing of other parameters and sending notification to the user on client app when the activity is detected.

The doorbell of the invention is further configured to detect an attempt of its theft by detecting, its movement in any direction, disconnection to Wi-Fi, disconnection to power, or a movement in the Global Positioning System (GPS) or a movement in x, y, Z coordinate values of sensors like gyroscope or accelerometer. A centralized system records the current state of the above mentioned activities. On detection of an attempt of theft, the doorbell sends an alert notification to the owner through the client application. The notifications may be in the form of an audio signal, a video signal, or in the form of text, FIG. 2 illustrates the anti-theft mechanism. A software mechanism is built into the doorbell application to sense if someone tries to steal the doorbell by pulling it out of the wall. The user is given a special control in the app to turn off the anti-theft mechanism, if he wants to unscrew the doorbell from the wall, to avoid the false notification.

Figure 3:
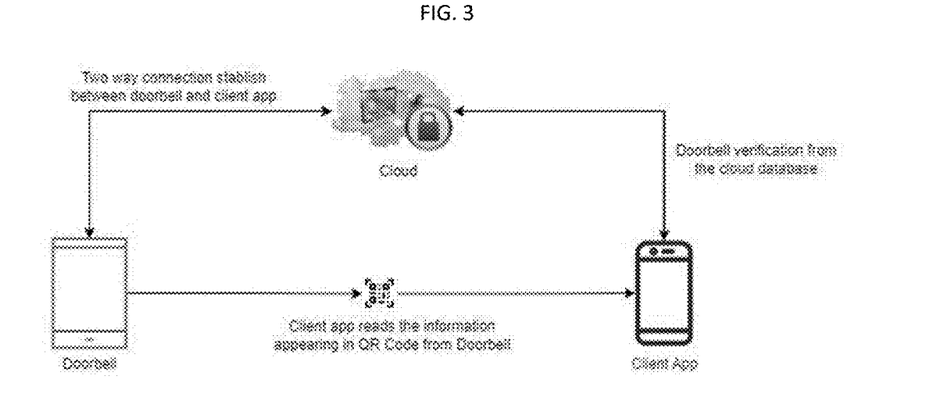
FIG. 3 shows the Client app scanning the QR code appearing on the doorbell screen, and sending that information to the cloud for verification of the device and storage.

The security system of the invention is configured to operate by the predefined instructions provided by the computer program installed on the doorbell and the data stored on the cloud server and is fully controllable by the owner through the client mobile application. Only one person, the real owner; the first person who has scanned the doorbell, by the client app, can be connected to the doorbell system, providing an additional feature to its anti-theft mechanism. The connection to the application is established by, scanning, the doorbell's unique information including the IMEI number, and storing this information in the database, FIG. 3 illustrates the mechanism. Any other person with same QR code of the doorbell system will not be connected to the already connected doorbell. The doorbell system is capable of creating different users like admin, editor, and viewer in order to give control to their family members, from the client app. Also, the client app has a special feature by the name "neighborhood" which allows doorbell users to share different events, detected by the doorbell system, with others.

The doorbell of the invention is further capable to sense the activities from its camera and send the following artificial intelligence-based alerts through the system:

Person/Facial Recognition, Baby/pet run away, Vehicle Detection, Weapon Detection, Fire Detection, Person Detection, Motion Detection, Parcel Left at the porch, Dog poop Detection, Animal Detection, Eavesdropper, a person jumping from backyard wall and Intruder.

Figure 4:
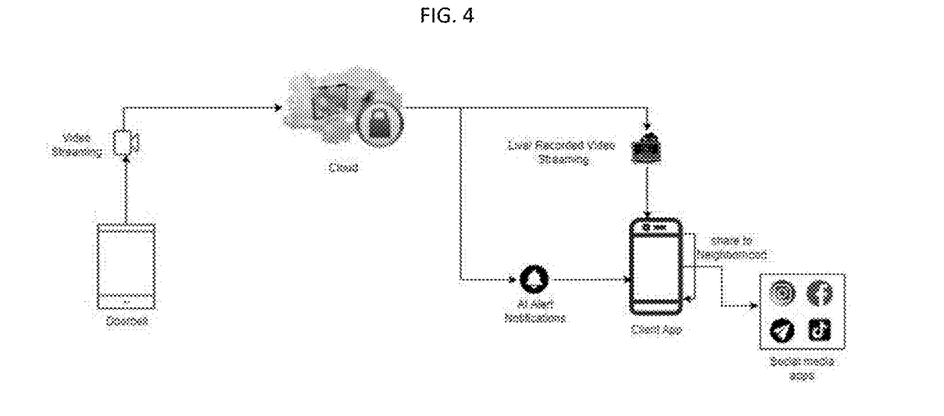
FIG. 4 shows a video stream transmitting from the doorbell is sent to the cloud for storage and processing where different AI algorithms perform detections which are stored in the cloud and notified to the user through the client application. Stored streams are viewable to the user through the client app and separate clips of detection can be shared with neighborhood or other social media apps through client application.

The doorbell is capable of continuously streaming video to the cloud storage and the user is be able to view the live stream at any time, FIG. 4. The stream is broadcasted to the AI server on the cloud, and stored, so that users can, later on, see the recorded video in the mobile app. The AI server receives the stream and passes it to different AI algorithms for parallel processing of the aforementioned alerts. If an AI model detects anything, it sends the notification to the client, notes the date and time of the activity which the AI model detected, and maps this information to the recorded video so that the user will be able to view only relevant parts of the recorded stream. Notifications are received by the client app at loud and the user then is able to open the notification either from the client app or through the notification section of mobile. Textual information is mentioned against each notification with time, date, and device, for example, garden camera has detected fire.

The AI models are trained and run on the server for each detection. For Facial Recognition, face encoding is generated from the images obtained from either the user's social media accounts, visitor logs, or from the mobile's gallery. The encoding is saved against each user of a doorbell and whenever any new visitor arrives at the door, the image of the visitor is taken, and sent to the cloud where the image encoding is generated and matched with the existing encodings of different people. If the encoding is matched with someone, the name of that person is returned to the user's mobile app. If the encoding does not match then a message of "unknown" is returned. Based on this matching and unmatching of the visitors, a visitor log is maintained which is accessible to the user through client application. Chat records are also maintained against each visitor. Other AI models, they are trained on datasets with hundreds of images and videos. The trained model files are then run on a cloud for real-time detections. AI-based object tracking is implemented with the AI models to avoid multiple notifications of the same detected activity.

Figure 5:
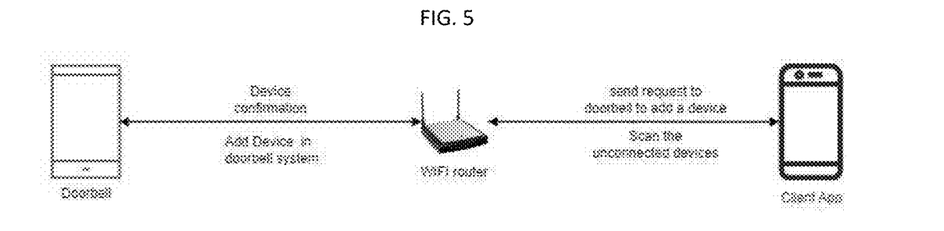
FIG. 5 The doorbell device scans the connected devices list from the internet router at home and notifies about unconnected devices.

FIG. 5 describes the capability of the doorbell to automatically sense the unconnected smart devices which can be connected to the doorbell and inform the user/owner. A sensing mechanism is the built-in software that will detect if any IOT device is left unconnected to the doorbell system. The doorbell's software will sense it by scanning the home network and matching the connected devices with the existing devices connected with the app, so user will be notified about that unconnected device. Also, the user is able to see the unconnected devices appearing, when trying to add any new device through the client app to the doorbell system. The software is capable of detecting the IOT device's Mac address, IP address, and name of the device to notify the user.

Figure 6:
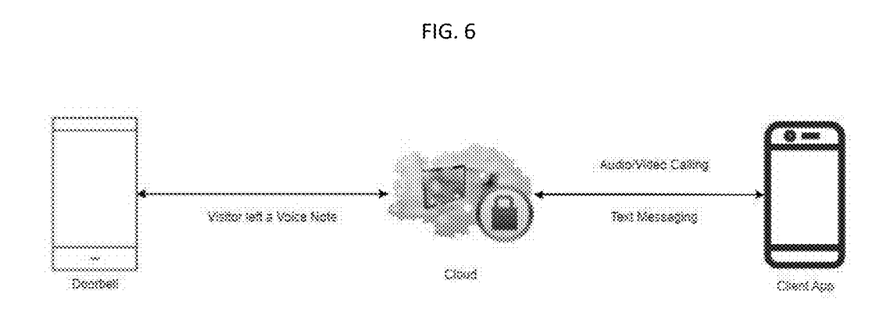
FIG. 6 The doorbell and the client app are connected to each other through the cloud for audio, video, text, and voice messaging communication with visitors.

The doorbell of the invention further allows the user to communicate with the visitors through one-way or two-way, audio or video calling, and text messaging. Doorbell allows the visitors to leave a voice message for the owner, the bell call is not responded, FIG. 6. The doorbell system interacts with the client app through the cloud on which multiple servers are running for different purposes. The cloud is responsible for all the communications, for example, for chatting it is managing through the sockets, for audio/video calling a special server is working to link the doorbell with the client app. Voice notes are maintained against each visitor's record on the server as well. If the user's app is away from internet, WI-FI or cellular, it will not receive any notification but as soon as the app connects with the internet, the user will receive all the missed notifications along with the visitor's voice notes. The two-way audio or video calling, one-way audio or video calling, and text messaging communications can only be initiated from the client app by the user and only the user has control over it, whereas, leavening a voice note will be generated by the visitor on the doorbell side. The system maintains the visitors' logs and chat history, and is able to mark a visitor as an unwanted person and generate an alert for it. The user is also able to share the unwanted person event details to the neighborhood.

Figure 7:
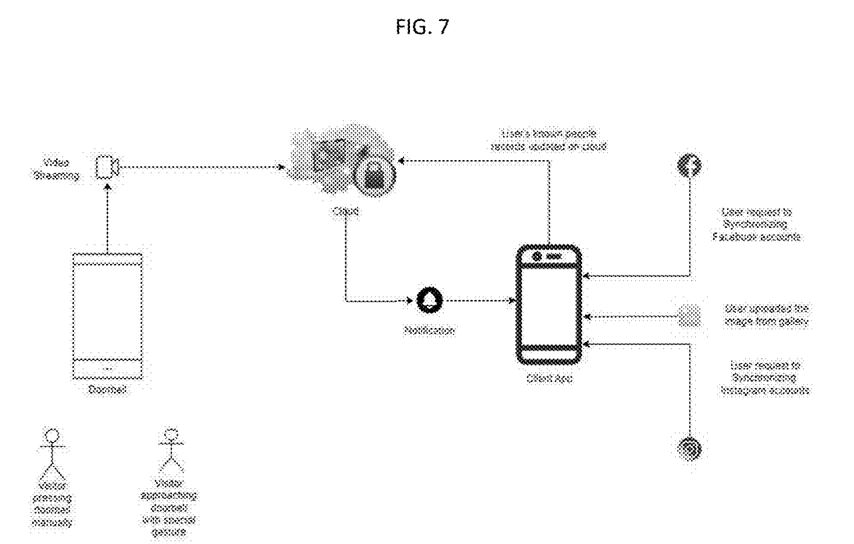
FIG. 7 shows the visitor's interaction with the doorbell using hand gesture or manual pressing of the button. Facial recognition is performed by matching visitors' face with the faces' data stored in the cloud database, including the data from user's social accounts, previous visitors and faces uploaded from gallery. User is notified about the visitor through notification, and separate visitor log is maintained where user have the option to add any visitor to the unwanted person/visitor category. Also, users can share the visitor's image to the neighborhood section to inform other people living in the neighborhood, as illustrated in FIG. 4.

The invention further provides the recognition of visitors from the owner's friends and followers on social media platforms, and is done by, synchronizing the owner's social media accounts, in an embodiment, with the cloud database through the client application; transmitting visitor's face detection data from the doorbell camera to the cloud database; matching the face data with the image data of Facebook and Instagram, and sending the results to the client application, FIG. 7.

The doorbell of the invention can be automatically pressed using a special hand gesture in front of the doorbell's camera. The doorbell system is also capable of ringing the doorbell from an appropriate distance from the doorbell. When a visitor approaches the doorbell with a special hand gesture, like thumbs up, it automatically recognizes the gesture and presses the doorbell button without pressing it manually. The function of manual pressing of the doorbell button is also present. When a visitor starts approaching, the doorbell system, which is already sending a stream to the AI server where all AI models are detecting different events including this special gesture recognition, facial recognition, and others, starts looking out for detecting the event type and based on that certain actions are performed by the system, FIG. 4.

Figure 8:
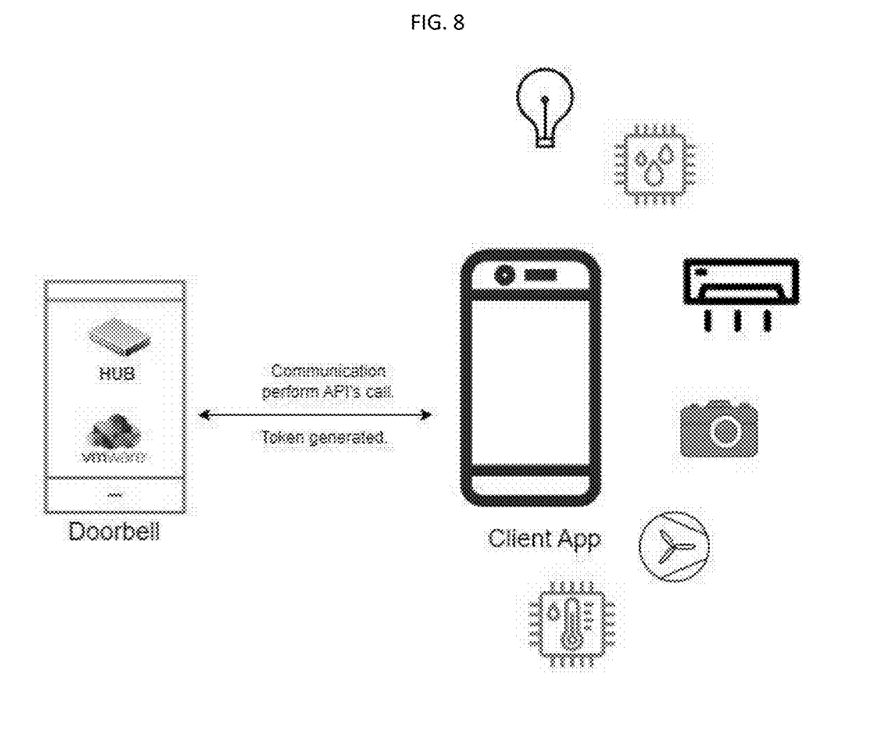
FIG. 8 shows the doorbell acting as a hub for all IOT devices connected with the doorbell system.

The doorbell of the invention allows the user to communicate with smart home devices like fan, bulbs, etc. through the client app. This client app allows user to connect and manage IOT devices. To connect IOT devices to the doorbell system, the doorbell is acting as a hub. The doorbell is on the local internet network. The doorbell system can scan all the smart devices in your home from the router. Once all devices are connected to the doorbell, it becomes the hub for all IOT devices. To connect new IOT devices to the doorbell system, user can use the client app to search for available devices on the network. Once the device is found, the user can add it to the doorbell system and assign it a unique identifier. Once the device is connected, users can manage it through the client app. User can set up automation routines, turn on/off any smart device, and receive notifications when certain event occurs. User can also control the device remotely through the app, even if they are not physically present at home. Overall, the doorbell system provides a centralized platform for managing IOT devices. By using a doorbell as a hub, users can easily connect and manage multiple devices on their local network. The client app provides a simple and intuitive interface for controlling and monitoring all connected devices, making it a valuable tool for smart home automation, FIG. 8.

Figure 9:
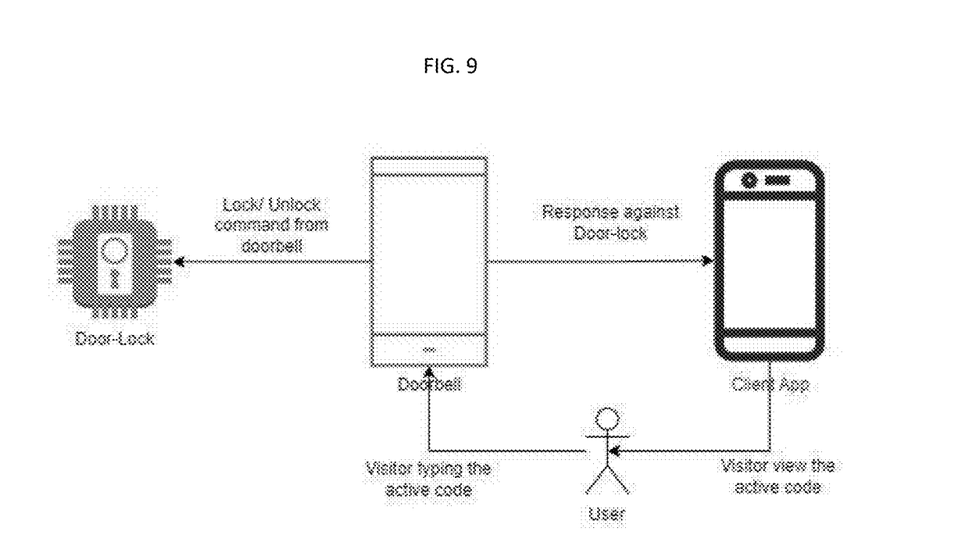
FIG. 9 describes the smart door lock operating through the doorbell. The user sees the security code appearing on the client app, and enters it into the doorbell to unlock the door.

The invention further provides a smart locking system that is operated through a real-time password mechanism, where the password, is generated based on the date, time, and unique information of the doorbell, keeps on changing every one to two minutes, and, is readable in real time on the client application. The passwords are generated with unique parameters, like present date and time, and doorbell's unique information like IMEI to which the door lock is associated. Using this information a unique code is generated which keeps on changing and the user can view the currently active code, on the client app. The verification of the code is done by typing it onto the doorbell screen as the doorbell has the same code generating mechanism as of the client app but the difference is that the doorbell does not show the code on the screen, rather it will ask the user to manually enter it to match it with its own generated code. No external communication mediums are required in the code generation and verification process FIG. 9.

Figure 10:
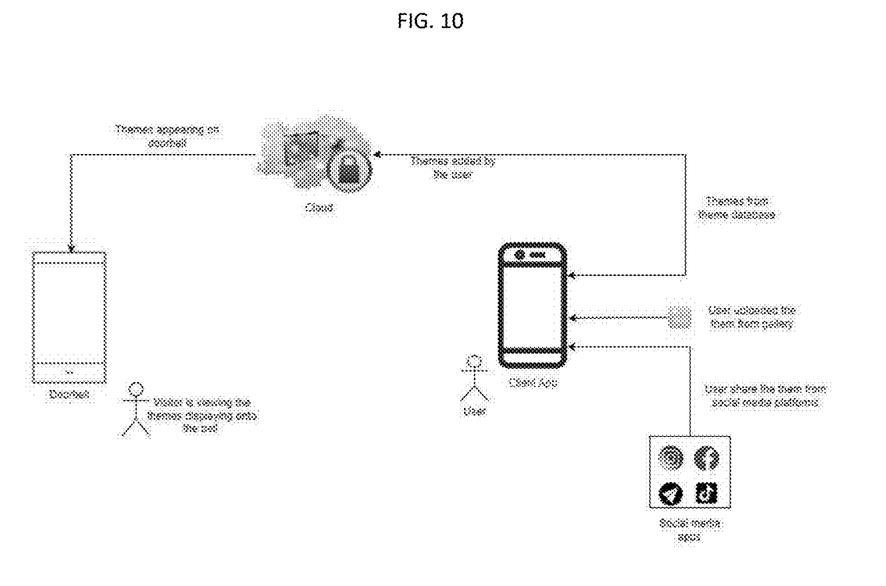
FIG. 10 shows how user is able to apply themes, to be displayed on the doorbell screen using the client app, from his social media accounts, from gallery, or from themes already stored in the database.
Figure 11:
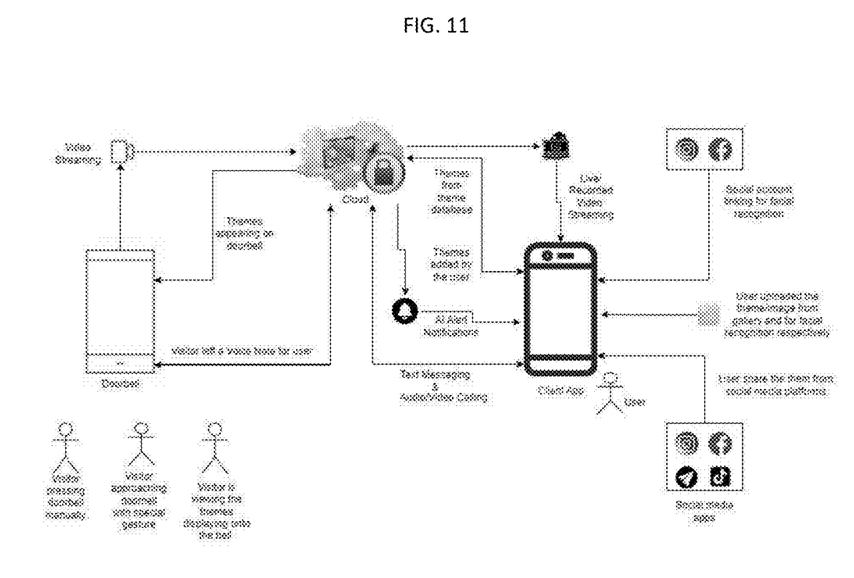
FIG. 11 shows an overall of the doorbell system, describing most of the activities performed through it.

The touchscreen of the doorbell has an interface capable, of displaying various themes, and, automatically changing the background color through the halo effect to display the text more clearly. The doorbell system has an LED interface for visitor's attraction and interaction with the doorbell. Various themes can be displayed on the doorbell which can be implemented to the doorbell from the client app. User can add the already available themes from the theme store, upload them from gallery, or share them from any of the social media applications to the client app. The screen is capable of displaying some text information, for example, the current temperature, user's address, a company logo, and/or a custom message. The text displayed is sometimes not prominent due to the background theme color and the user needs to change the color by itself. To solve this problem, the doorbell of the invention uses multiple techniques like applying a halo effect onto the doorbell theme so that the text colors become prominent irrespective of the background color. Also, the AI system helps to avoid this problem by predicting the text color based on the theme background. The theme is sent to an AI server and an AI algorithm for theme color prediction returns the best color of the text to be usable on top of the theme, FIG. 10.

What is claimed is:

1. A doorbell comprising a processor connected to:
at least a camera; a GPU; a touch-screen for display; an accelerometer; a gyroscope 3-axis; a proximity sensor; a light sensor; a battery, with battery temperature sensor, chargeable by a standard 16V-24V power supply or a USB C-type charger; a fingerprint sensor; a GPS; an E-SIM module; a Wi-Fi; a Zigbee; a Bluetooth; and a motion detection 3D radar sensor; or any combination thereof;
where the doorbell is controllable and operable through, a software installed on it, a client application installed on owner's or user's mobile device, and, a central cloud server and database; the doorbell is configured to;
connect wirelessly to smart devices in a building;
sense activities by the camera and generate artificial intelligence (AI) based alerts, the activities include visitors' detection and recognition through facial recognition, unwanted person recognition, motion detection, detection of baby or pet running away, weapon detection, fire detection, detection of a parcel left at porch, detection of parcel theft, dog poop detection, vehicle detection, animal detection, eavesdropper detection, detection of a person jumping from backyard wall, and intruder detection, or any combination thereof;
detect the owner's or user's mobile device location inside the building, when the owner interacts with the doorbell to control the smart devices by sending a command to the doorbell followed by a response action by the doorbell to that command;
sense if someone tries to steal the doorbell by pulling it out of a wall in which the doorbell is attached to;

detect unconnected smart devices in the building and inform the owner;

allow communication, between the owner and a visitor, through one-way audio/video calling, two-way audio/video calling and/or text messaging;

allow the visitor to leave a voice message for the owner;

recognize visitors from the owner's friends and followers on social media platforms, and a gallery on the mobile device;

have a doorbell button electronically pressed by detecting a special hand gesture in front of the camera; and to work with smart locks with a real-time password mechanism.

2. The doorbell of claim 1, which is configured to detect the owner's mobile device real-time location inside the building, through data obtained from the Wi-Fi and the smart devices, and allows the owner to command the smart devices, through an indoor positioning system.

3. The doorbell of claim 2, wherein the indoor positioning system is built by:

inputting the information of, the floor plan of the building comprising number of floors, location of rooms, location of the Wi-Fi, location of Bluetooth beacons, and location of the doorbell;

auto-calculating the room dimensions through the mobile's camera, by a process wherein an AI algorithm calculates the dimensions of a standard known size object on a wall, followed by the calculation of dimensions of the wall by using the dimensions of the standard object, and repeating the process for each wall of the room;

surveying each room and submitting data points; and adding, into the central cloud database, for AI-based model training, signal strengths of the Wi-Fi, the Bluetooth, and the doorbell.

4. The doorbell of claim 1, wherein the owner's interaction with the doorbell to control the smart devices is carried out by a method comprising:

sending a voice command to the cloud by the owner through the client application;

recording the voice command;

sending the voice command to an AI algorithm on the cloud for converting it to text;

recognizing the command through the text;

sending a feedback to the doorbell, and, the doorbell performing an action directed by the command.

5. The doorbell of claim 1, wherein the doorbell is configured to detect an attempt of its theft, an anti-theft mechanism, by detecting, its movement in any direction, disconnection to Wi-Fi, disconnection to power, a movement in Global Positioning System or a movement in x, y, z coordinate values of the gyroscope 3-axis, and the accelerometer.

6. The doorbell of claim 5, wherein, on the detection of an attempt of theft, the doorbell is configured to send an alert notification to the owner through the client application.

7. The doorbell of claim 5, wherein the doorbell is configured to allow the owner to turn off the anti-theft mechanism, through the client application.

8. The doorbell of claim 1, which is configured to be fully controllable and operable, by the owner, through the client application.

9. The doorbell of claim 8, wherein only one person, the owner, can be connected directly to the doorbell through the client app using scanning process.

10. The doorbell of claim 9, wherein the connection to the application is established by, scanning a QR code, displayed at the touchscreen of the doorbell, for its unique information including IMEI number, and storing this information in the database.

11. The doorbell of claim 10, wherein any other person with the same QR code of the doorbell is not connected to the already connected doorbell.

12. The doorbell of claim 11, which is configured to enable the owner to create various users including admin, editor, and viewer, in order to give control to family members.

13. The doorbell of claim 1, wherein the client app allows the owner to share different events, detected by the doorbell, with neighbors and the social media platforms.

14. The doorbell of claim 1, wherein there is a continuous transmission of audio and video data, to the central cloud database, for storage, to be accessible to the owner at any time as live or recorded.

15. The doorbell of claim 1, which is configured to allow the visitor to leave a voice message for the owner.

16. The doorbell of claim 1, wherein the process of recognition of the visitors, comprises:

collecting image data, from social media accounts of the owner, by synchronizing the accounts with the cloud database through the client application; from the mobile device gallery; and from visitors log; and, storing the image data into the cloud database;

transmitting visitor's face detection data from the doorbell camera to the cloud database;

matching the face data with the image data of the database; and, sending results, as visitor notification, to the client application.

17. The doorbell of claim 1, which is configured to automatically detect the unconnected smart devices by scanning local home network and matching the connected devices with the devices connected with the client app; and to generate notifications comprising Mac address, IP address, and name of the unconnected device.

18. The doorbell of claim 1, which is configured, to maintain visitors' logs and chat history, and to be able to mark a visitor as an unwanted person and generate an alert for it.

19. The doorbell of claim 1, wherein the smart lock is operated through a real-time password mechanism, where the password, is generated based on the date, time, and unique information of the doorbell, keeps on changing every one to two minutes, and, is readable in real-time on the client application.

20. The doorbell of claim 1, wherein the touchscreen of the doorbell has an interface capable, of displaying various themes, and, automatically changing background color either through halo effect or based on text color prediction by AI algorithm, to display text clearer.

21. The doorbell of claim 20, wherein the interface is further capable of displaying some text information, comprising: current temperature, user's address, a company logo, and, a custom message, or any combination thereof.

22. The doorbell of claim 1, wherein the doorbell is configured to detect an attempt of the parcel theft and generate an alert for it.

23. A security system, comprising a doorbell; a mobile device; and a central cloud database; wherein the doorbell comprises a processor connected to:

at least a camera; a GPU; a touch-screen for display; an accelerometer; a gyroscope 3-axis; a proximity sensor;

a light sensor; a battery, chargeable by a standard 16V-24V power supply or a USB C-type charger; a fingerprint sensor; a GPS; a E-SIM module; a Wi-Fi; Zigbee; a Bluetooth; and a motion detection 3D radar sensor; or any combination thereof;

where the doorbell is controllable and operable through, a software installed on it, a client application installed on owner's mobile device, and, a central cloud server and database; and is configured to:

connect wirelessly to smart devices in a building;

sense activities by the camera and generate artificial intelligence-based alerts, the activities include visitors detection and recognition through facial recognition, motion detection, detection of baby or pet runaway, weapon detection, fire detection, detection of a parcel left at porch, detection of parcel theft, dog poop detection, vehicle detection, animal detection, eavesdropper detection, a person jumping from backyard wall, and intruder detection, or any combination thereof;

detect the owner's or user's mobile device real-time location inside the building, through data obtained from the Wi-Fi and the smart devices, when the owner interacts with the doorbell to control the smart devices by sending a command to the doorbell security system followed by a response action by the doorbell system to that command;

sense if someone tries to steal the doorbell by pulling it out of a wall in which the doorbell is attached to;

detect unconnected smart devices in the building and inform the owner;

allow communication, between the owner and a visitor, through one-way/two-way audio/video calling and/or text messaging;

allow the visitor to leave a voice message for the owner;

recognize visitors from the owner's friends and followers on social media platforms, and a gallery on the mobile device;

have a doorbell button electronically pressed by detecting a special hand gesture in front of the camera; and to work with smart locks with a real-time password mechanism;

wherein the doorbell is configured to detect the owner's or user's mobile device real-time location inside the building, and allow the owner to command the smart devices, through an indoor positioning system built by, inputting the information of the floor plan of the building comprising number of floors, location of rooms, location of Wi-Fi, location of Bluetooth beacons, and location of the doorbell; auto-calculating the room dimensions through the mobile's camera, by a process wherein an AI algorithm calculates the dimensions of a standard known size object on a wall, followed by the calculation of dimensions of the wall by using the dimensions of the standard object, and repeating the process for each wall of the room;

surveying each room and submitting data points; and adding, into the central cloud database, for AI-based model training, signal strengths of the Wi-Fi, the Bluetooth, and the doorbell;

wherein the owner's interaction with the doorbell to control the smart devices is carried out by a method comprising sending a voice command to the doorbell system by the owner through the client application; recording the voice command, sending the voice command to an AI algorithm on the cloud for converting it to text, recognizing the command through the text, and, performing an action directed by the command;

wherein the doorbell is configured to detect an attempt of its theft, an anti-theft mechanism, by detecting, its movement in any direction, disconnection to Wi-Fi, disconnection to power, a movement in Global Positioning System, or a movement in x, y, z coordinate values of the gyroscope 3-axis, and the accelerometer;

wherein, on the detection of an attempt of theft, the doorbell is configured to send an alert notification to the owner through the client application; wherein the doorbell is further configured to allow the owner to turn off the anti-theft mechanism, through the client application;

wherein the doorbell is configured to be fully controllable and operable, by the owner, through the client application where only one person, the owner, can be connected to the doorbell through the client application, the connection to the application is established by, scanning a QR code, displayed at the touchscreen of the doorbell, for its unique information including IMEI number, and storing this information in the central cloud database, and any other person with the same QR code of the doorbell is not connected to the already connected doorbell;

wherein the doorbell is configured to enable the owner to create various users including admin, editor, and viewer, in order to give control to family members;

wherein the client app allows the owner to share different events, detected by the doorbell, with neighbors and the social media platforms;

wherein there is a continuous transmission of audio and video, from the doorbell to the central cloud database, for storage, to be accessible to the owner at any time as live or recorded;

wherein the doorbell is configured to allow the visitor to leave a voice message for the owner;

wherein the process of recognition of the visitors, comprises: collecting image data, from social media accounts of the owner, by synchronizing the accounts with the central cloud database through the client application; from the mobile device gallery; and from visitors log; and, storing the image data into the central cloud database; transmitting the visitor's face detection data from the doorbell camera to the central cloud database; matching the face data with the image data of the central cloud database; and, sending results, as visitor notification, to the client application;

wherein the doorbell is configured, to automatically detect the unconnected smart devices by scanning local home network and matching the connected devices with the devices connected with the client app; and to generate notifications comprising Mae address, IP address, and name of the unconnected device;

wherein the doorbell is configured to maintain visitors' logs and chat history, and is able to mark a visitor as an unwanted person and generate an alert for it;

wherein the smart lock is operated through a real-time password mechanism, where the password, is generated based on the date, time, and unique information of the doorbell, keeps on changing every one to two minutes, and, is readable in real-time on the client application;

wherein the touchscreen of the doorbell has an interface capable, of displaying various themes, and, automatically changing background color through halo effect, based on text color prediction by AI algorithm, to display text clearer; and wherein the interface is further capable of displaying some text information, comprising:
current temperature, user's address, a company logo, and, a custom message, or any combination thereof; and,
wherein the doorbell is configured to detect an attempt of the parcel theft and generate an alert for it.

* * * * *